United States Patent
Schlotterbeck et al.

(10) Patent No.: US 8,451,435 B2
(45) Date of Patent: May 28, 2013

(54) OPTICAL ANEMOMETRIC PROBE WITH TWO MEASUREMENT AXES

(75) Inventors: Jean-Pierre Schlotterbeck, Rochefort-Samson (FR); Philippe Rondeau, Saint Marcel les Valence (FR)

(73) Assignee: Thales, Neuilly sur Seine (FR)

( * ) Notice: Subject to any disclaimer, the term of this patent is extended or adjusted under 35 U.S.C. 154(b) by 350 days.

(21) Appl. No.: 12/964,775

(22) Filed: Dec. 10, 2010

(65) Prior Publication Data

US 2011/0141471 A1 Jun. 16, 2011

(30) Foreign Application Priority Data

Dec. 11, 2009 (FR) ...................................... 09 06002

(51) Int. Cl.
*G01P 5/26* (2006.01)
(52) U.S. Cl.
USPC .......................................... 356/28.5; 356/364
(58) Field of Classification Search
CPC .............. G01P 5/26; G01S 17/58; G01S 7/499
USPC .......................................... 356/27–28.5, 364
See application file for complete search history.

(56) References Cited

U.S. PATENT DOCUMENTS

| | | | |
|---|---|---|---|
| 3,915,572 A * | 10/1975 | Orloff | 356/28.5 |
| 5,587,785 A * | 12/1996 | Kato et al. | 356/28.5 |
| 7,352,447 B2 | 4/2008 | Schlotterbeck et al. | |
| 7,352,476 B2 | 4/2008 | Baillon et al. | |
| 7,423,736 B2 | 9/2008 | Baillon et al. | |
| 7,495,822 B2 | 2/2009 | Baillon et al. | |
| 7,580,132 B2 | 8/2009 | Baillon et al. | |
| 7,616,294 B2 | 11/2009 | Lacondemine et al. | |
| 2007/0159868 A1 | 7/2007 | Baillon et al. | |
| 2007/0223004 A1 | 9/2007 | Baillon et al. | |
| 2010/0134780 A1 | 6/2010 | Rodeau et al. | |

FOREIGN PATENT DOCUMENTS

| | | |
|---|---|---|
| WO | 2005114252 | 12/2005 |
| WO | 2009050180 | 4/2009 |
| WO | 2009134221 | 11/2009 |

OTHER PUBLICATIONS

Nishi et al., "Complementary 2 Dimensional Laser Doppler Velocimeter with an Optical Fiber Probe," Proc. of Intl. Soc. for Opt. Eng., SPIE, USA, vol. 1267, pp. 257-263 (Jan. 1, 1990).

* cited by examiner

*Primary Examiner* — Gregory J Toatley
*Assistant Examiner* — Rufus Phillips
(74) *Attorney, Agent, or Firm* — Baker & Hostetler, LLP

(57) ABSTRACT

An optical anemometric probe includes a laser source emitting a linearly polarized primary light beam and an optical block having splitting means for separating the primary beam, an optical reference pathway, an optical emission pathway and an optical measurement pathway. The optical block includes optical means of rotation of the polarization arranged at the output of the laser source and before the splitting means. The optical emission pathway has an optical circulator, a first optical emission/reception head illuminating a first measurement zone, and a second optical emission/reception head illuminating a second measurement zone. The optical circulator has four ports, e.g., a first input port, a second and a third input/ouput port linked respectively to the first optical head and to the second optical head, and a fourth port linked to the optical measurement pathway.

9 Claims, 3 Drawing Sheets

OPTICAL ANEMOMETRIC PROBE WITH TWO MEASUREMENT AXES

CROSS-REFERENCE TO RELATED APPLICATION

This application claims priority to foreign French patent application No. FR 09 06002, filed on Dec. 11, 2009, the disclosure of which is incorporated by reference in its entirety.

FIELD OF THE INVENTION

The field of the invention is that of optical anemometry and in particular optical anemometry on board aircraft.

BACKGROUND OF THE INVENTION

To pilot an aircraft, it is necessary to know at least its relative altitude, its speed with respect to the ambient air and its angle of attack. These various data may be measured locally, in the near field, in the vicinity of the skin of the aircraft or in the far field, away from the aerodynamic field disturbed by the craft. The near-field data are obtained conventionally by measuring a certain number of aerodynamic parameters such as the static pressure allowing determination of the altitude, the total pressure allowing determination of the relative speed, the local angle of attack and the total temperature allowing the necessary corrections to be made. These measurements are performed by a certain number of probes situated on the skin of the aircraft. Mention will be made notably of static-pressure probes, pressure or "TAS" probes, the acronym standing for "True Air Speed", temperature or "TAT" probes, the acronym standing for "Total Air Temperature", angle of attack or "AOA" probes, the acronym standing for "Angle Of Attack", sideslip or "SSA" probes, the acronym standing for "Side Slip Angle", etc.

The far-field data are performed by optical anemometry devices called "LiDARs", the acronym standing for "Light Detection And Ranging". A LiDAR emits and receives light along a determined measurement axis. So-called "3D" conventional anemometry LiDAR architectures allowing measurements to be made in the three dimensions of space use the smallest possible number of measurement axes for obvious cost reasons. For fixed measurement axis systems, three measurement axes suffice if performing so-called "long range" measurements, that is to say without any appreciable effect of the local aerodynamic field. Otherwise, four measurement axes are necessary if the measurements are performed at short range where the boundary layer effects mean that the local flux is no longer representative of all the variations of the parameters of "the upstream infinity".

FIG. 1 represents the diagram of a system for anemobarometric measurements comprising at one and the same time near-field measurement sensors and "LiDARs". For obvious safety reasons, the craft has three autonomous measurement channels.

Channels 1 and 3, to the left and at the centre of FIG. 1, essentially comprise the following pneumatic probes and sensors: a Pitot 11 and 31, an angle of attack probe 12 and 32, a sideslip probe 13 and 33, a temperature probe 14 and 24 (dual-element probe shared on two channels) and two static-pressure probes 15 and 16 and 35 and 36 situated on either side of the fuselage. These various sensors are represented in white and grey in FIG. 1. As seen, these channels make it possible to measure all the anemobarometric parameters necessary for piloting. These primary measurement channels are entirely conventional.

Channel 2, to the right of FIG. 1, essentially comprises the following sensors and probes: two LiDARs 21 and 22 comprising two dual-axis optical heads symbolized by black arrows, a temperature probe 24 and two static-pressure probes 25 and 26 situated on either side of the fuselage. These various sensors are represented in black in FIG. 1. The two LiDARs make it possible to ensure at one and the same time the measurements of speed and of angle of attack and of sideslip, that is to say the so-called "TAS", "AOA" and "SSA" functions. As seen, this channel also makes it possible to measure all the anemobarometric parameters necessary for piloting.

Finally, a so-called "Standby" backup instrumentation 38 which is situated on the instrument panel of the aircraft uses an additional Pitot 31 and shares the static-pressure probes with channel 3 (static-pressure probes 35 and 36).

A conventional optical architecture 100 used to embody the LiDARs of FIG. 1 is represented in FIG. 2. In this and in the following figure, the following conventions have been adopted:

for the propagation of the light beams, the directions of propagation of the light are represented by arrows with a triangular tip, the linear polarization of the light is represented by an arrow with a V-shaped tip when the polarization plane is in the plane of the sheet (so-called transverse electric or TE polarization) and by a centred circle when the polarization plane is perpendicular to the plane of the sheet (so-called transverse magnetic or TM polarization).

The implementation presented in FIG. 2 corresponds to a fibred architecture, that is to say the various optical functions are linked together by means of optical fibres, and more particularly of polarization-maintaining fibres. As seen in FIG. 2, the conventional optical architecture 100 essentially comprises:

A laser source 101 providing a linearly polarized reference wave. In FIG. 2, the direction of polarization of this wave is in the plane of the sheet;

A divider device 102 splitting the polarized reference wave provided by this source 101 into two pathways: the reference pathway R in which a first luminous flux circulates and the power pathway P in which a second luminous flux circulates;

The power pathway P follows one of the two outputs of the splitter device 102. The second luminous flux of this pathway thereafter enters an amplifier or "booster" 103;

The second luminous flux thereafter passes through an optical circulator 104. The function of this circulator is to steer at one and the same time the flux of the power pathway towards the optical head 105 and the flux received towards the measurement devices 106 and 107. This circulator comprises three pathways. The first pathway corresponds to the input of the amplified luminous flux. The second pathway corresponds to the output of the said flux towards the optical head and the third pathway corresponds to the output of the backscattered luminous flux towards the measurement channel 106 and 107. Thus, the luminous flux introduced on the first pathway is transmitted with a minimum of losses towards the second pathway without being transmitted towards the third pathway whereas a luminous flux introduced by the second pathway is transmitted with a minimum of loss towards the third pathway without being transmitted towards the first pathway. A customary way of minimizing the losses of this function for a wide range of wavelengths is to use a polarization splitting device. Thus, the circulator transmits a light beam polarized linearly in the plane of the sheet of the first pathway towards the second pathway and the circulator transmits a light beam polarized linearly perpendicularly to the plane of the sheet of the second pathway towards the third pathway. By way of example, the element 104 may be a polarization splitting device associated with a quarter-wave plate contained in the projection optics 105. It should be noted that, in this type of architecture, the emission beams are polarized under circular polarization as late as possible so as to minimize the signal sources of "narcissus" type, that is to say the echoes on impurities or elements of the system, such as for example, the reflections on the various diopres encountered on the optical path of the emission and reception pathways;

On output from the circulator 104, the flux of the power pathway enters the optical head 105 which ensures a double function. On the one hand, it projects the optical flux linearly polarized in the plane of the sheet into the atmosphere at the desired measurement distance. Moreover, it gathers the flux backscattered by the particles or the aerosols contained in the measurement volume and provides as output a reception beam which enters the circulator 104 which therefore transmits towards the measurement pathway a backscattered flux linearly polarized perpendicularly to the plane of the sheet. In FIG. 2, the optical head 105 is represented conventionally by a double arrow, symbol of the lens and a plane porthole. The change of polarization may be effected through the use of a quarter-wave plate in the optical head;

A mixing device 106 of interferometric type which may be, by way of example, a polarization-maintaining coupler allows the coherent recombination of the flux emanating from the reference pathway and the return flux coming from the circulator 104;

The two beams emanating from the device 106 are directed towards the two diodes of a balanced detector 107, making it possible to circumvent the relative noise of the source, also called "RIN" for "Relative Intensity Noise". The reference wave is oriented by the optical element 108 according to the same polarization as the signal collected or backscattered. This element 108 may be a half-wave plate. In the case where the propagation of the beams is ensured by means of optical fibres, this function may be obtained by effecting a cross weld (slow axis/fast axis) on two polarization-maintaining fibres.

The most expensive elements of this architecture are the laser source 101, the "booster" 103, the detector 107 and the signal processing. An aircraft installation comprises four measurement axes, distributed as two dual-axis optical heads.

The installation of this type of LiDAR on aircraft suffers from several major drawbacks, detailed hereinbelow:

The angular dynamic swing of the aircraft is fairly high (generally lying between −5° to)+25°. The angular dynamic swing of the air speed vector may be doubled in local field mode, thus passing near to 60 degrees, this being very significant and having an impact on the geometric dilution. Thus, there is a risk of losing a measurement axis when it lies practically normal to the speed vector that one seeks to measure;

The measurement of the angle of attack is critical for the maintenance of the performance in terms of both precision and passband, substantially more than the measurement of the speed itself;

The necessarily disturbed near-field 4-axis measurement distributed in two places leads to a level of redundancy in the 3D measurement of almost zero, thus now precluding a genuine check of integrity of the measurement;

The placement and the orientation of the measurement axes must be such as to be sure of not inverting the sign of the speed projection to the extent that optical homodyning without frequency shift is generally used, that is to say a single source is used to generate the signal wave on the one hand and the reference wave on the other hand.

In order to maintain the metrology performance throughout the flight domain and with a low false alarm probability, these drawbacks lead to the overdimensioning of certain characteristics of the LiDAR such as, for example, its emitted optical power so as to obtain better visibility of the signal.

The sign inversion or aliasing problem may be avoided by employing an acousto-optical modulator or a second reference laser, coherent but shifted in wavelength. These solutions are necessarily complex and expensive.

SUMMARY OF THE INVENTION

The device according to the invention alleviates these drawbacks. The idea includes minimally modifying the optical architecture to offer more angles of view, that is to say measurement axes, without multiplying the number of sources, of means of amplification, of detection or of processing of the signal. As was seen on the device of FIG. 2, a single polarization of the light is used on emission and on reception. The device according to the invention uses two mutually perpendicular light polarization axes. Two luminous fluxes coming from the same source are thus emitted on two differently oriented optical heads, both fluxes being polarized linearly but their polarization planes being perpendicular. The detection and the analysis of the signals backscattered by these two optical heads can be done very simply. Two measurement axes are thus created without considerably overburdening the optical architecture.

More precisely, the invention includes an optical anemometric probe including at least one laser source emitting a linearly polarized primary light beam, an optical block and an optical measurement pathway, the optical block comprising splitting means for separating the said primary beam into two secondary beams, an optical reference pathway, an optical "emission" pathway, the first secondary beam passing through the optical reference pathway, the second secondary beam passing through the optical "emission" pathway, the optical emission pathway comprising at least one optical circulator and a first optical "emission/reception" head illuminating a first measurement zone, wherein:

the optical block comprises optical means of rotation of the polarization arranged at the output of the laser source and before the splitting means, the said optical means of rotation of the polarization making it possible to rotate the plane of polarization of the primary light beam by a known angle, the optical block also comprises a second optical emission/reception head illuminating a second measurement zone;

the optical circulator comprises four ports, a first input port through which the second secondary beam enters, a second and a third input/ouput port linked respectively to the first optical head and to the second optical head and a fourth port linked to the optical measurement pathway, the circulator being devised in such a way that, when the second secondary beam is polarized linearly in a predetermined plane, it is conducted towards the second port, when the second secondary beam is polarized linearly in a plane perpendicular to the said predetermined plane, it is conducted towards the third port, the first beam backscattered by the first measurement zone, received by the first optical head and polarized perpendicularly to the predetermined plane, entering on the second port is conducted towards the fourth port, the second beam backscattered by the second measurement zone, received by the second optical head and polarized in the predetermined plane, entering on the third port is conducted towards the fourth port.

This 4-pathway circulator may be simply a bidirectional polarization splitter embodied either as "free" optics, in which case the splitter is a mirror or a polarization splitting cube, or as fibred optics by a 4-port polarization splitter. This polarization splitter is associated with a quarter-wave plate.

Advantageously, the optical means of rotation of the polarization have at least two favoured control positions, the first position corresponding to an orientation of the plane of polarization of the primary light beam in the predetermined plane, the second corresponding to an orientation of the plane of polarization of the primary light beam perpendicularly to the said predetermined plane; a third beneficial position corresponds to a rotation of the plane of polarization of the primary light beam at 45 degrees to the said predetermined plane. The optical means of rotation of the polarization can comprise means making it possible to periodically switch from the first position to the second position.

Advantageously, the optical reference pathway comprises an element able to rotate the plane of polarization of the light by 90 degrees, the optical "emission" pathway comprises an optical amplifier, and the optical measurement pathway comprises an optical mixing device for mixing the first secondary beam emanating from the optical reference pathway and the first and second backscattered beams.

The invention also relates to an optical device for anemometric measurements comprising at least two anemometric probes such as described hereinabove. This device can also comprise a single laser source, two identical optical blocks and a single optical measurement pathway, the said source emitting a linearly polarized primary light beam, the optical device for anemometric measurements comprising an optical splitter for separating the said primary beam into two primary sub-beams, the first primary sub-beam supplying the first optical block, the second primary sub-beam supplying the second optical block, each optical block comprising splitting means for separating one of the two primary sub-beams into two secondary beams, an optical reference pathway, an optical "emission" pathway and an optical measurement pathway, the first secondary beam passing through the optical reference pathway, the second secondary beam passing through the optical "emission" pathway, the optical emission pathway comprising at least one optical circulator and a first optical "emission/reception" head illuminating a first measurement zone, each optical block comprising optical means of rotation of the polarization arranged at the input of the primary sub-beam and before the splitting means, the said optical means of rotation of the polarization making it possible to rotate the plane of polarization of the primary light beam by a known angle, the optical block also comprising a second optical emission/reception head illuminating a second measurement zone;

the optical circulator comprising four ports, a first input port through which the second secondary beam enters, a second and a third input/ouput port linked respectively to the first optical head and to the second optical head and a fourth port linked to the optical measurement pathway, the circulator being devised in such a way that, when the second secondary beam is polarized linearly in a predetermined plane, it is conducted towards the second port, when the second secondary beam is polarized linearly in a plane perpendicular to the said predetermined plane, it is conducted towards the third port, the first beam backscattered by the first measurement zone, received by the first optical head and polarized perpendicularly to the predetermined plane, entering on the second port is conducted towards the fourth port, the second beam backscattered by the second measurement zone, received by the second optical head and polarized in the predetermined plane, entering on the third port is conducted towards the fourth port.

BRIEF DESCRIPTION OF THE DRAWINGS

The invention will be better understood and other advantages will become apparent on reading the nonlimiting description which follows and by virtue of the appended figures, in which.

DETAILED DESCRIPTION

Figure 1:
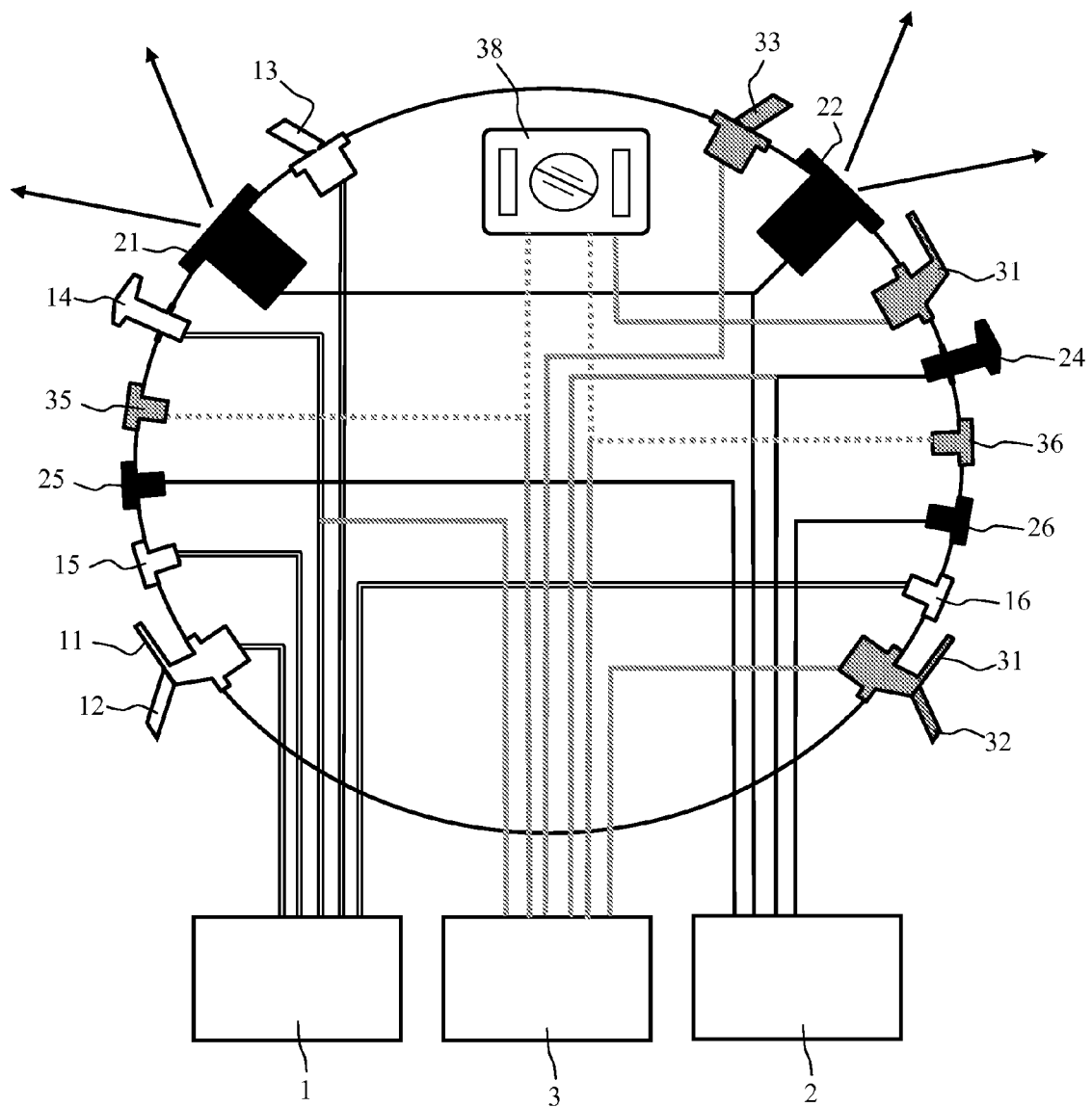
FIG. 1 already commented on represents the diagram of a system for anemobarometric measurements comprising at one and the same time near-field measurement sensors and "LiDARs"
Figure 2:
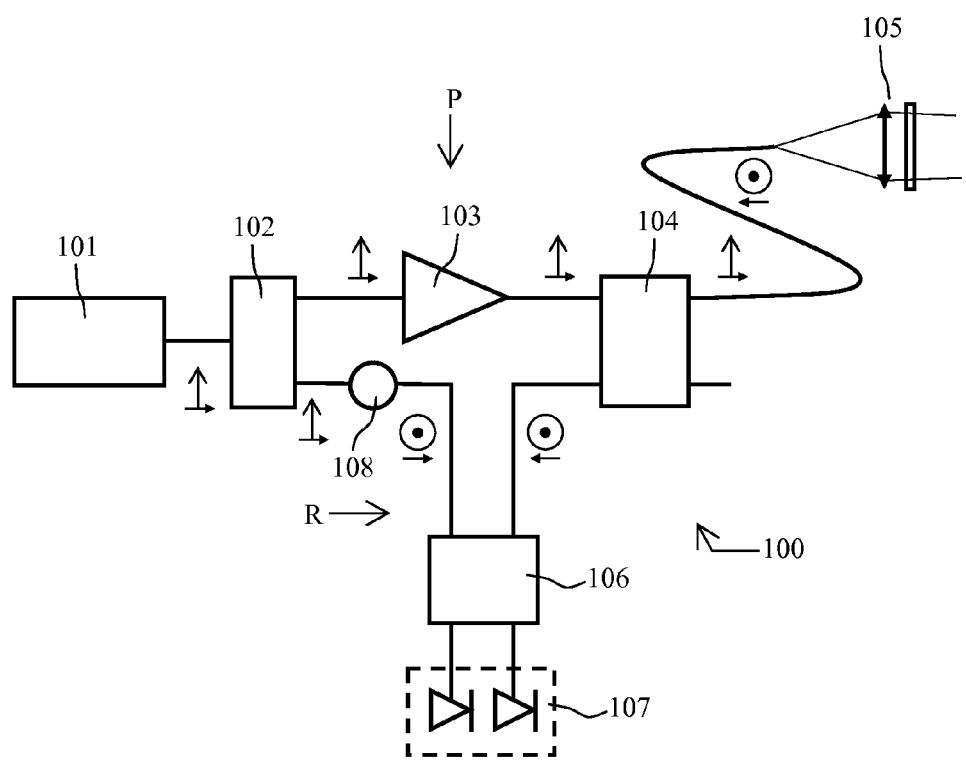
FIG. 2 also described represents a conventional optical architecture used to produce LiDARs.
Figure 3:
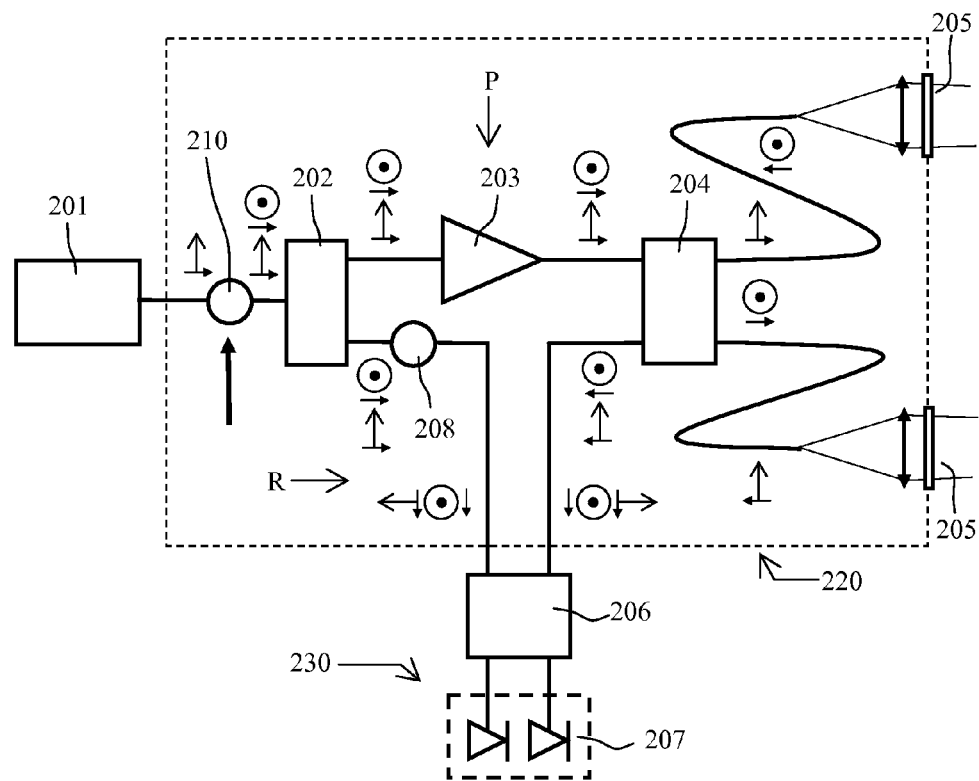
FIG. 3 represents the optical architecture of a LiDAR "with two optical heads" according to the invention.

By way of example, FIG. 3 represents a first optical architecture of a LiDAR "with two optical heads" according to the invention. It essentially comprises a laser source 201 emitting a linearly polarized primary light beam, an optical block 220 and an optical measurement pathway 230 which are detailed hereinbelow.

The laser source 201 provides a linearly polarized primary reference wave. In FIG. 3, the direction of polarization of this wave is in the plane of the sheet.

The optical block 220 includes:

Optical means 210 of rotation of the polarization arranged at the output of the laser source, these optical means of rotation of the polarization making it possible to rotate the plane of polarization of the primary light beam by a known angle;

A splitter device 202 separating the polarized reference wave provided by this source 201 into two secondary beams, the first secondary beam passing through an optical reference pathway, the second secondary beam passing through an optical emission pathway or power pathway P. The second luminous flux of this pathway thereafter enters an amplifier or "booster" 203;

Two optical "emission/reception" heads 205 illuminating respectively a first measurement zone and a second measurement zone. These optical heads have an architecture akin to those of telescopes, that is to say they are devised so as to focus the emission beams at very long range;

These two optical heads 205 are linked to an optical circulator 204. This optical circulator comprises four ports, a first input port through which the second secondary beam enters, a second and a third input/ouput port linked respectively to the first optical head and to the second optical head and a fourth port linked to the optical measurement pathway, the circulator being devised in such a way that, when the second secondary beam is polarized linearly in a predetermined plane, it is conducted towards the second port, when the second secondary beam is polarized linearly in a plane perpendicular to the said predetermined plane, it is conducted towards the third port, the first beam backscattered by the first measurement zone, received by the first optical head and polarized perpendicularly to the predetermined plane, entering on the second port is conducted towards the fourth port, the second beam backscattered by the second measurement zone, received by the second optical head and polarized in the predetermined plane, entering on the third port is conducted towards the fourth port. This element 204 is a bidirectional polarization splitting device.

On output from the circulator 204, the flux of the power pathway therefore enters, as a function of its polarization, one and/or the other of the two optical heads 205. Each optical head thus ensures a double function. On the one hand, it projects the optical flux into the atmosphere at the desired measurement distance. Moreover, it gathers the flux backscattered by the measurement volume and provides as output a reception beam which, through the circulator 204, is transmitted towards the measurement pathway exhibiting a polarization perpendicular to that of the beam arriving by the power pathway, this polarization rotation may be carried out by employing a quarter-wave plate;

A mixing device 206 of interferometric type which may be, by way of example, a polarization-maintaining coupler, allows the coherent recombination of the flux emanating from the reference pathway and of the reception flux or fluxes coming from the circulator 204;

The two beams emanating from the device 206 are directed towards the two diodes of a balanced detector 207, making it possible to circumvent the relative noise of the source, also called "RIN" for "Relative Intensity Noise". The reference wave is oriented by the optical element 108 according to the same polarization as the backscattered signals. This element 208 may be a half-wave plate. In the case where the propagation of the beams is ensured by means of optical fibres, this function may be obtained by effecting a cross weld (slow axis/fast axis) on two polarization-maintaining fibres.

The optical means of rotation of the polarization 210 make it possible to choose either a totally transverse electric polarization TE, or a totally transverse magnetic polarization TM, or else a polarization in part transverse electric TE and in part transverse magnetic TM. In the first case, the secondary flux is emitted solely on the first optical head, in the second case, the secondary flux is emitted solely on the second optical head, finally in the third case, the flux is emitted in part on the first optical head and in part on the second optical head. In the first two cases, detection is ensured in the manner already described. In the third case, the detector receives a sum of two signals. These two signals which correspond to two "Doppler Lines" are seen by the measurement means at the same time. These two signals are at different frequencies and are, consequently, easy to detect. On the other hand, it is essential to determine from which optical head they emanate. The determination of the optical head can be done either by "tracking", the signal not being able to change frequency abruptly, or else during a doubt resolution sequence, obtained by momentarily killing a polarization, therefore a signal.

As was stated, one of the favoured uses of this type of probe is the measurement of the aerodynamic parameters on aircraft. The position of the speed vector of the aircraft in the ambient air varies in a significant angular span. Hence, the system for processing the signal, not represented in FIG. 3, emanating from the detection means can comprise means making it possible to select one or the other of the optical output heads as a function of the angular position of the optical heads with respect to the speed vector to be measured, so as to optimize the measurement. It is thus possible to optimize the geometric dilution by preserving all the power, therefore the full sensitivity on the chosen measurement axis. At low altitude of the aircraft, the sensitivity is no longer actually a problem in so far as the atmosphere comprises a large number of utilizable particles. On the other hand, it is necessary to have very high integrity of the measurements since the aircraft is in a critical takeoff or landing phase. In this case, it is possible to position the optical means of rotation of the polarization at an intermediate value which leads to emission on both pathways. In a variant, if the optical amplifier or "booster" does not allow simultaneous amplification on both polarizations, it is possible to carry out a switching between the two emission pathways at a rate of a few tens of Hz.

If the four basic measurement axes are equipped with this type of probe, the signal processing then has eight measurement axes, corresponding to about four orders of redundancy.

Figure 4:
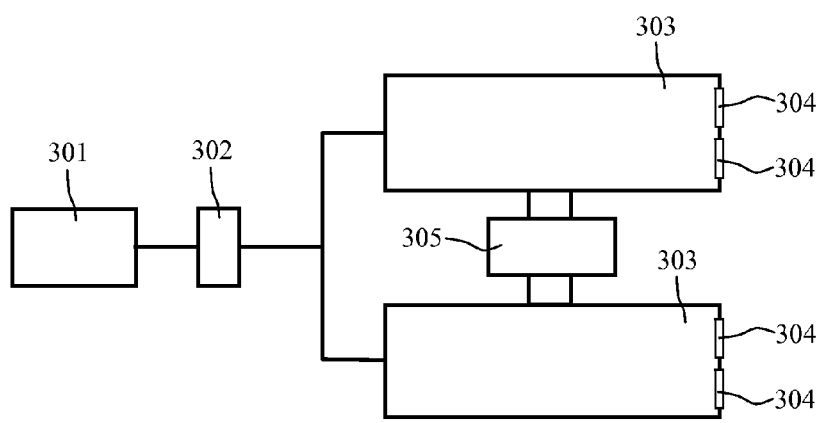
FIG. 4 represents the optical architecture of a LiDAR "with four optical heads" according to the invention.

When a complete measurement system comprises several probes, it may be beneficial for at least two of the optical blocks to be served by a single laser source. Thus, a single source can simultaneously address two or four different optical emission/reception heads. In a slightly more complex variant illustrated in FIG. 4, a laser source 301 can address by means of a splitter 302 two optical blocks 303 each comprising two optical heads 304, these two blocks being linked to a single measurement pathway 305. In this case, the architecture of the device comprises four measurement axes with only:

1 injector laser source 301,
1 single pathway for signal detection and processing 305,
2 pathways for amplifying and splitting the beams emanating from the laser source,
4 optical emission/reception heads 304.

The probe according to the invention is applicable to a pulsed architecture for steering an anemometric measurement axis towards an ancillary function, with a low occupancy factor. This ancillary function may be used, for example, to carry out measurements by "Doppler" effect or measurements of altitude with respect to the ground. This type of ancillary function is indeed appropriate for applications on board helicopters which generally fly at low altitude and which need functions of this type.

The devices comprising probes according to the invention have very similar costs to those comprising probes comprising just a single optical head. Indeed, the cost of the output optics is marginal compared with that of the remainder of the architecture in so far as the optical head comprises only a few lenses of small size. Only the control rotation optical means represent a higher cost. However, at the price of a marginal increase in cost, the implementation of this invention makes it possible to very appreciably increase the angular precision and the low-altitude integrity of a LiDAR either for anemometry for aircraft (thus ensuring the "TAS" speed measurement functions and the "AOA" and "SSA" clinometry functions) or for helicopters (thus ensuring the functions for measuring the "TAS" speed and its lateral and vertical components Vy and Vz).

What is claimed is:

1. An optical anemometric probe comprising:
   at least one laser source emitting a linearly polarized primary light beam;
   an optical block; and
   an optical measurement pathway, wherein
   the optical block comprises:
   splitting means for separating the said primary beam into two secondary beams;
   an optical reference pathway; and
   an optical emission pathway, the first secondary beam passing through the optical reference pathway, the second secondary beam passing through the optical emission pathway, the optical emission pathway comprising at least one optical circulator and a first optical emission/reception head illuminating a first measurement zone, and wherein
   the optical block comprises optical means of rotation of the polarization arranged at the output of the laser source and before the splitting means (202),
   said optical means of rotation of the polarization making it possible to rotate the plane of polarization of the primary light beam by a known angle,
   the optical block further comprises a second optical emission/reception head illuminating a second measurement zone,
   the optical circulator comprises four ports, a first input port through which the second secondary beam enters, a second and a third input/ouput port linked respectively to the first optical head and to the second optical head and a fourth port linked to the optical measurement pathway, the circulator being devised in such a way that, when the second secondary beam is polarized linearly in a predetermined plane, it is conducted towards the second port, when the second secondary beam is polarized linearly in a plane perpendicular to the said predetermined plane, it is conducted towards the third port, the first beam backscattered by the first measurement zone, received by the first optical head and polarized perpendicularly to the predetermined plane, entering on the second port is conducted towards the fourth port, and the second beam backscattered by the second measurement zone, received by the second optical head and polarized in the predetermined plane, entering on the third port is conducted towards the fourth port.

2. The optical anemometric probe according to claim 1, wherein the optical circulator comprises a bidirectional polarization splitter associated with a quarter-wave plate.

3. The optical anemometric probe according to claim 1, wherein the optical means of rotation of the polarization have at least three favoured control positions, the first position corresponding to a rotation of the plane of polarization of the primary light beam in the predetermined plane, the second corresponding to a rotation of the plane of polarization of the primary light beam perpendicularly to the said predetermined plane, the third corresponding to a rotation of the plane of polarization of the primary light beam at 45 degrees to the said predetermined plane.

4. The optical anemometric probe according to claim 3, wherein the optical means of rotation of the polarization comprise means making it possible to periodically switch from the first position to the second position.

5. The optical anemometric probe according to claim 1, wherein the optical reference pathway comprises an element able to rotate the plane of polarization of the light by 90 degrees.

6. The optical anemometric probe according to claim 1, wherein the optical "emission" pathway comprises an optical amplifier.

7. The optical anemometric probe according to claim 1, wherein the optical measurement pathway comprises an optical mixing device for mixing the first secondary beam emanating from the optical reference pathway and the first and second backscattered beams.

8. An optical device for anemometric measurements, comprising at least two anemometric probes according to claim 1.

9. An optical device for anemometric measurements comprising:
   a single laser source;
   two identical optical blocks; and
   a single optical measurement pathway, said source emitting a linearly polarized primary light beam, wherein
   the optical device for anemometric measurements further comprises an optical splitter for separating the said primary beam into two primary sub-beams,
   the first primary sub-beam supplies the first optical block,
   the second primary sub-beam supplies the second optical block,
   each optical block comprises splitting means for separating one of the two primary sub-beams into two secondary beams,
   the optical device for anemometric measurements further comprises an optical reference pathway, an optical emission pathway, and an optical measurement pathway,
   the first secondary beam passes through the optical reference pathway,
   the second secondary beam passes through the optical emission pathway,
   the optical emission pathway comprises at least one optical circulator and a first optical emission/reception head illuminating a first measurement zone,
   each optical block comprises optical means of rotation of the polarization arranged at the input of the primary sub-beam and before the splitting means,
   said optical means of rotation of the polarization makes it possible to rotate the plane of polarization of the primary light beam by a known angle,
   the optical block further comprises a second optical emission/reception head illuminating a second measurement zone,
   the optical circulator comprises four ports, a first input port through which the second secondary beam enters, a second and a third input/ouput port linked respectively to the first optical head and to the second optical head and a fourth port linked to the optical measurement pathway, and
   the circulator is devised in such a way that, when the second secondary beam is polarized linearly in a predetermined plane, it is conducted towards the second port, when the second secondary beam is polarized linearly in a plane perpendicular to the said predetermined plane, it is conducted towards the third port, the first beam backscattered by the first measurement zone, received by the first optical head and polarized perpendicularly to the predetermined plane, entering on the second port is conducted towards the fourth port, the second beam backscattered by the second measurement zone, received by the second optical head and polarized in the predetermined plane, entering on the third port is conducted towards the fourth port.

* * * * *